United States Patent [19]

Stephenson et al.

[11] Patent Number: 4,469,666

[45] Date of Patent: Sep. 4, 1984

[54] CATALYST UNITS FOR PRODUCING HYDROCYANIC ACID

[75] Inventors: David J. Stephenson, Sharnwood; Alan E. Heywood, St. Albans; Gordon L. Selman, Reading, all of England

[73] Assignee: Johnson Matthey & Co., Limited, London, England

[21] Appl. No.: 376,501

[22] Filed: May 10, 1982

Related U.S. Application Data

[62] Division of Ser. No. 204,380, Nov. 5, 1980, abandoned.

[30] Foreign Application Priority Data

Nov. 8, 1979 [GB] United Kingdom ............... 7938722

[51] Int. Cl.³ .............................................. C01C 3/02
[52] U.S. Cl. .................................... 423/376; 422/190; 422/222
[58] Field of Search ............... 422/211, 222, 171, 177, 422/180, 310, 190; 252/472, 477 R; 423/376

[56] References Cited

U.S. PATENT DOCUMENTS

| | | | |
|---|---|---|---|
| 2,607,663 | 8/1952 | Perry et al. | 423/376 |
| 3,215,495 | 11/1965 | Jenks et al. | 423/376 |
| 3,360,335 | 12/1967 | Jenks | 423/376 |
| 3,423,185 | 1/1969 | Ballard et al. | 423/376 |
| 3,993,600 | 11/1976 | Hunter | 252/465 |

FOREIGN PATENT DOCUMENTS 337680 11/1930 United Kingdom .

*Primary Examiner*—John Doll
*Assistant Examiner*—Wayne A. Langel
*Attorney, Agent, or Firm*—Cushman, Darby & Cushman

[57] ABSTRACT

This invention relates to catalyst units embodying or consisting of catalytic material in wire or strip (herein referred to simply as "wire") form and especially to such units for catalytic oxidation of gases.

The catalyst unit of the invention is particularly suitable for use in the manufacture of hydrocyanic acid comprises a pack of woven metallic gauzes wherein at least some of the gauzes disposed at or towards the front of the pack are made from wire (as herein defined) having a cross-sectional area greater than at least some of the gauzes disposed at or towards the rear of the pack.

4 Claims, No Drawings

CATALYST UNITS FOR PRODUCING HYDROCYANIC ACID

This is a division of application Ser. No. 204,380 filed Nov. 5, 1980, now abandoned.

This invention relates to catalyst units embodying or consisting of catalytic material in wire or strip (herein referred to simply as "wire") form and especially to such units for catalytic oxidation of gases.

One well known form of catalyst unit comprises a closely packed sequential array, "pack" or "pad" of gauzes woven from wire made from a platinum rhodium alloy. Such catalyst units including platinum group metal gauzes are used for the production of hydrocyanic acid in the Andrussow Process. HCN formation proceeds according to one or other of the following reactions:

$$NH_3 + CH_4 + 1\tfrac{1}{2}O_2 \rightarrow HCN + 3H_2O (\Delta H = -474.8 \text{ KJ})$$

$$NH_3 + CH_4 \rightarrow HCN + 3H_2 (\Delta H = 256.2 \text{ KJ})$$

It is the desire of the HCN producer to operate a plant continuously under conditions giving the highest yield of HCN, but this does not necessarily mean operation of the plant under that most economical conditions. In many instances the most economical operating conditions may dictate that the plant is operated below maximum yield. Operating below maximum yield can be unsatisfactory to the producer who also has to consider the return on capital for the plant.

For the producer it is essential that the ammonia oxidation process satisfies the following criteria:
(i) maximum conversion is obtained with
(ii) minimum precious metal content and minimum metal loss from the catalyst.

In the Andrussow Process the high temperature rearrangement of the crystal structure of the platinum and platinum group metal alloys greatly impairs the strength of the gauzes and it is an object of the present invention to improve durability of platinum group metal gauzes used in the Andrussow Process.

We have now found that the poor durability stems from the fact that the bulk of the reaction occurs on certain gauzes positioned towards the front of the unit (considered in the direction of gases passing through the unit).

The present invention therefore provides means for obtaining the same conversion efficiency as previously obtained but with the use of less precious metal or alternatively of obtaining greather conversion efficiency with the same or approximately the same quantity of precious metal. It is a further object of the invention to maintain activity of the catalyst unit for longer periods than hitherto and also reduce the effects of contamination thereof whilst using less metal than such an increase would require in a conventional plant.

According to the present invention a catalyst unit for use for example in the manufacture of HCN comprises a pack of woven metallic gauzes wherein at least some of the gauzes disposed at or towards the front of the pack are made from wire (as herein defined) having a cross-sectional area greater than at least some of the gauzes disposed at or towards the rear of the pack. The "front" of the pack is considered to be that portion of the pack which gas entering the pack contacts first.

The invention also includes a catalyst unit comprising a pack of woven metallic gauzes wherein the pack is divided into a plurality of stages, each individual stage including at least one gauze with the gauze or gauzes thereof made from wire (as herein defined) of the same cross-sectional area and wherein the cross-sectional area of the wire of the gauze or gauzes in any one stage is greater than the cross-sectional area of the wire of the gauze or gauzes in the next succeeding stage considered in the direction of flow of reactants through the unit.

Those gauzes having the thickest wire are positioned where most of the reaction occurs and, therefore, where greatest deterioration occurs. Preferably, the wire forming the gauzes is composed of a platinum group metal, an alloy of platinum group metals or an alloy of one or more platinum group metals with one or more non-platinum group metals wherein the platinum group metal component is at least 90% by weight of the total metal content. Preferred platinum group metal alloys are a 10% rhodium platinum alloy or a 5% rhodium 5% palladium platinum alloy.

One embodiment of the invention will now be described and compared with a catalyst unit comprising a pack of gauzes. A specified number of gauzes at the front of the pack remain unchanged but the succeeding gauzes are replaced by a number of gauzes made from a wire of smaller diameter. Either all of the replacement gauzes may be made of wire of the same reduced diameter or groups of them may be made of wire of the same diameter but the wire for each group being progressively less in diameter than the previous group. In an alternative embodiment all the replacement gauzes are made of wire having a diameter which is less than that of the wire of the gauzes preceding them.

The operational life of a gauze pack is also limited by contamination of the leading gauzes. According to the present invention this problem may be overcome without increasing the platinum group metal inventory by increasing the total number of gauzes involving the substitution of a greater number of thin wire gauzes for some of the existing thick wire gauzes. This increases the life of the pack without a reduction in efficiency but with the use of less catalytic metal than would otherwise be the case.

It is not feasible to indiscriminately reduce the diameter of the wire in all the gauzes since during the catalytic process there is a rearrangement of the crystal structure composing the wire and to make the gauzes of too thin a wire would result in shorter operating life and consequently more frequent shutdowns of the plant.

Where a specified number of gauzes are unchanged their number in a high pressure plant will generally be about twenty. In medium pressure plants the number of gauzes which remain unchanged will preferably be about 3. In a further embodiment of the present invention, gauzes normally made from thinner wire and positioned at or towards the rear of the catalyst may also contain wire of the greater thickness normally present in gauzes at or towards the front of the pack. In other words, some components at least of either the warp or the weft of the gauze may be made of thin wire and some of thick wire. Alternatively the entire warp or the entire weft may be made of thin wire and the entire weft and the entire warp respectively made of thick wire.

We claim:

1. In a process for the preparation of HCN by passing NH$_3$ and CH$_4$ through a catalyst, the improvement which comprises using, as the catalyst, a catalyst unit comprising a pack of woven metallic gauzes having a front where the $NH_3$ and $CH_4$ enter and a rear where the reaction mixture exits the catalyst, the gauzes disposed at the front of the pack where the $NH_3$ and $CH_4$ enter the catalyst being made from wire having a cross-sectional area greater than the gauzes disposed at the rear of the pack where the reaction mixture exits, the wire being composed of a platinum group metal, an alloy of platinum group metals or an alloy of at least one platinum group metal with at least one non-platinum group metal wherein the platinum group metal component is at least 90% by weight of the total metal content, the pack being divided into a plurality of stages, each individual stage including a plurality of gauzes made from wire of the same cross-sectional area and wherein the cross-sectional area of the wire of the gauzes in any one stage is greater than the cross-sectional area of the wire of the gauzes in the next succeeding stage considered in the direction of flow of reactants through the catalyst unit.

2. A process according to claim 1 wherein the platinum group metal is platinum.

3. A process according to claim 1 wherein the alloy of platinum group metals is a 10% rhodium platinum alloy.

4. A process according to claim 1 wherein the alloy of platinum group metals is a 5% rhodium 5% palladium platinum alloy.